(12) United States Patent
Ogawa et al.

(10) Patent No.: US 7,747,723 B2
(45) Date of Patent: Jun. 29, 2010

(54) COMMUNICATION SYSTEM AND COMMUNICATION MANAGEMENT METHOD

(75) Inventors: Yukio Ogawa, Tokyo (JP); Kiminori Sugauchi, Yokohama (JP); Daisuke Yokota, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 750 days.

(21) Appl. No.: 11/362,141

(22) Filed: Feb. 27, 2006

(65) Prior Publication Data

US 2007/0067428 A1    Mar. 22, 2007

(30) Foreign Application Priority Data

Sep. 20, 2005   (JP)   ............................. 2005-272133

(51) Int. Cl.
- *G06F 15/173* (2006.01)
- *G06F 15/16* (2006.01)
- *G06F 11/00* (2006.01)
- *H04L 1/00* (2006.01)

(52) U.S. Cl. .................. 709/223; 709/224; 709/225; 709/226; 709/201; 709/203; 709/240; 370/229; 370/232; 370/234

(58) Field of Classification Search ................. 709/203, 709/304, 201, 245, 223–226, 204, 240; 340/506, 340/531, 521, 539, 573; 370/230–239, 229

See application file for complete search history.

(56) References Cited

U.S. PATENT DOCUMENTS

| | | | |
|---|---|---|---|
| 5,799,002 A * | 8/1998 | Krishnan | ..................... 370/234 |
| 6,263,360 B1 * | 7/2001 | Arnold et al. | ............... 709/203 |
| 6,671,254 B1 | 12/2003 | Nakahira | |
| 6,738,350 B1 * | 5/2004 | Gao et al. | ..................... 370/232 |
| 2002/0091825 A1 * | 7/2002 | Shuster | ........................ 709/226 |
| 2003/0071724 A1 * | 4/2003 | D'Amico | ..................... 340/506 |
| 2003/0177179 A1 * | 9/2003 | Jones et al. | .................. 709/203 |
| 2004/0078426 A1 | 4/2004 | Nagami et al. | |
| 2005/0018606 A1 * | 1/2005 | Dropps et al. | ............... 370/230 |
| 2005/0267929 A1 * | 12/2005 | Kitamura | ..................... 709/201 |

FOREIGN PATENT DOCUMENTS

| | | |
|---|---|---|
| JP | 2000-232483 | 8/2000 |
| JP | 2004-139291 | 5/2004 |

* cited by examiner

*Primary Examiner*—Wong F Chan
*Assistant Examiner*—Benjamin M Thieu
(74) *Attorney, Agent, or Firm*—Antonelli, Terry, Stout & Kraus, LLP.

(57) ABSTRACT

A management system accepts a connection request from a client computer to a server computer, acquires connection settings information, calculates a network bandwidth required for processing for connection from the client computer to the server computer, stores the connection request into a connection request processing queue, determines whether the processing for the connection from the client computer to the server computer can be performed or not, and notifies the client computer of a server identification number. The client computer issues a connection request to the server computer based on the received server identification number, and starts communication therewith. In spite of concentration of connection requests from a large number of client computers to server computers, the connection requests can be processed while controlling the communication data volume generated in a network at a point where the server computers are aggregated, so as to avoid occurrence of congestion.

10 Claims, 9 Drawing Sheets

SYSTEM CONFIGURATION

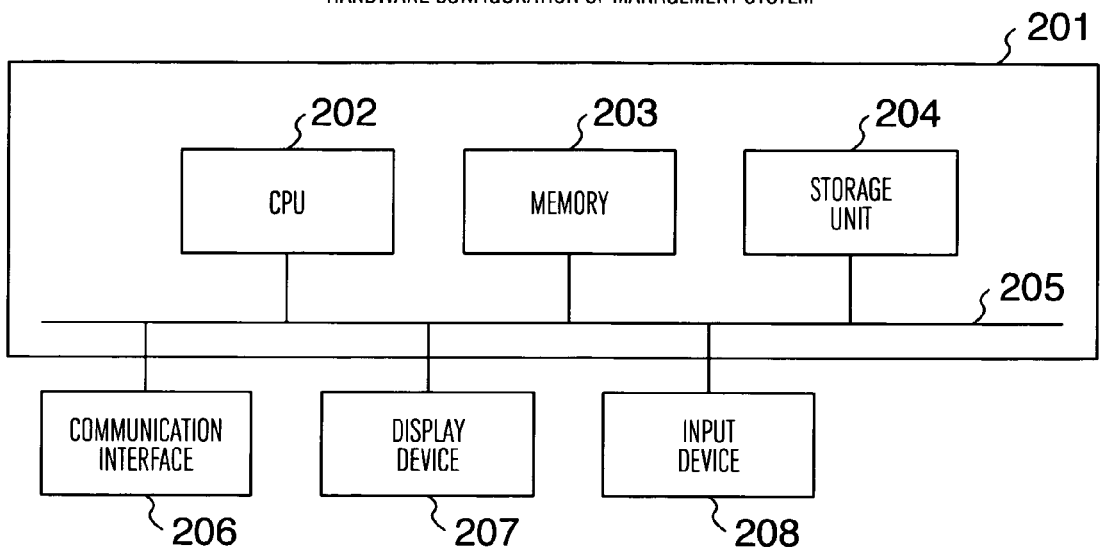
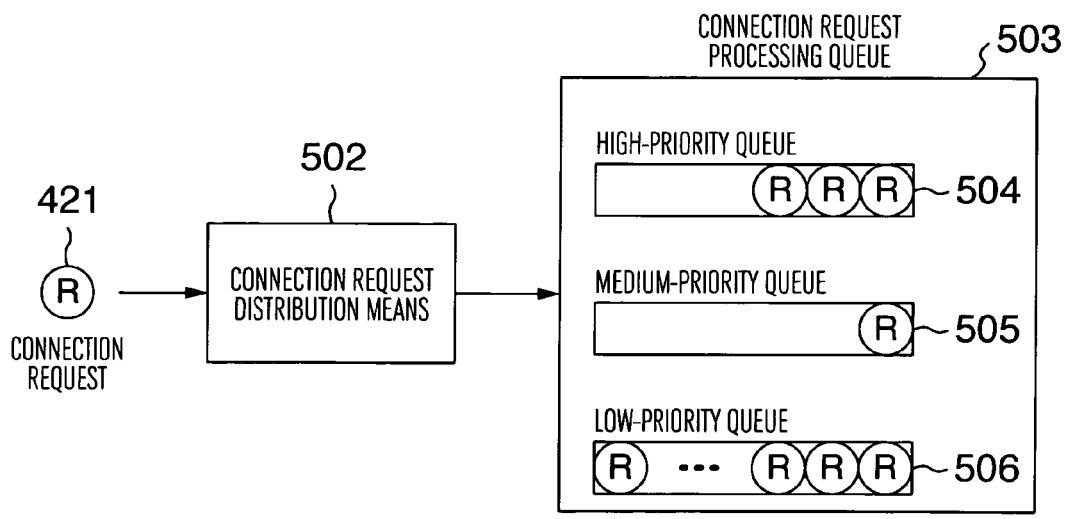

EXAMPLE OF SYSTEM CONFIGURATION IN DATA CENTER

FLOW OF PROCESSING OF CONNECTION REQUEST

FLOW OF PROCESSING OF BOOT REQUEST

FLOW OF PROCESSING FOR REGISTERING BOOT TIME

FLOW OF PROCESSING OF AUTOMATIC BOOT REQUEST BASED ON ESTIMATED BOOT TIME

COMMUNICATION SYSTEM AND COMMUNICATION MANAGEMENT METHOD

BACKGROUND OF THE INVENTION

The present invention relates to a communication system and a communication management method, and particularly relates to a communication system and a communication management method in which connection requests or boot requests from client computers to server computers are controlled to make communications between the client computers and the server computers.

In a communication system constituted by a plurality of server computers disposed and aggregated in a data center or the like, and a plurality of client computers to be connected to the server computers through networks, communications from the client computers to the server computers are concentrated in the network located at the aggregation point where the server computers are disposed.

Generally, the communication data volume required for processing of connection from a client computer to a server computer is larger than the communication data volume with which the client computer uses ordinary service of the server computer. In addition, when the client computer makes a connection request, the client computer has to boot the server computer if the server computer has not been booted yet. The communication data volume required for processing to boot the server computer is also larger than the communication data volume required for ordinary data communication. Accordingly, communication data volume larger than that in ordinary data communication arises in the network located at the aggregation point in a period of time when connection requests rush from a large number of client computers to server computers, for example, when business is started.

When connection requests rush from a large number of client computers to server computers as descried above, it is likely that there is generated communication data volume larger than the allowable bandwidth of the network at the aggregation point. Thus, it is likely that there occurs congestion.

As a background-art technique capable of preventing the aforementioned congestion from occurring, for example, there is known a technique disclosed in JP-A-2000-232483 or the like. According to this background-art technique, when communication data volume increases beyond a threshold value of the network capacity in a communication system through a network, a communication path is established between nodes so as to increase the network bandwidth.

As another background-art technique, for example, there is known a technique disclosed in JP-A-2004-139291 or the like. This background-art technique relates to a data communication relaying apparatus, which makes control, for example, to reject relay of a connection request from a client computer in accordance with the number of connections established between server computers and client computers, so as to prevent congestion from occurring.

SUMMARY OF THE INVENTION

According to the background-art technique disclosed in JP-A-2000-232483, a communication path can be added to increase the bandwidth of a network in accordance with increase in communication data volume. However, there is a problem that the technique cannot be applied to a communication system in which the bandwidth of a network is fixed so that a communication path cannot be added.

On the other hand, the background-art technique disclosed in JP-A-2004-139291, the number of connections established between server computers and client computers is detected so that control can be made in accordance with the detected number. However, due to absence of any mechanism to detect the communication data volume of a network, connection requests from client computers cannot be controlled in accordance with the communication data volume of a network or the like. Therefore, there is a problem that a large volume of communication data generated in the network leads to congestion in the network.

To solve the aforementioned problems belonging to the background art, an object of the present invention is to provide a communication system and a communication management method in which even if connection requests rush from a large number of client computers to server computers, communication data volume larger than an allowable bandwidth of a network at an aggregation point of server computers can be prevented from being generated, so that congestion can be prevented from occurring. Another object of the invention is to provide a communication system and a communication management method in which a waiting time involved in a connection request of a user can be reduced.

According to the invention, the aforementioned objects are attained by a communication system including: a plurality of server computers; a plurality of client computers which can be connected to the server computers through a first network; and a management system to be connected to the plurality of server computers through a second network, the first network being connected to the second network; wherein the management system accepts a connection request from each client computer to each server computer, acquires connection settings information about connection from the client computer to the server computer, calculates a network bandwidth required for processing of the connection from the client computer to the server computer, stores the connection request from the client computer to the server computer into a connection request processing queue, determines whether the processing of the connection from the client computer to the server computer can be performed or not based on whether a communication data volume required for the processing of the connection exceeds an allowable bandwidth of the second network or not, and notifies the client computer of a result of the determination.

According to the invention, the aforementioned objects are also attained by a communication system including: a plurality of server computers; a plurality of client computers which can be connected to the server computers through a first network, each server computer being booted in accordance with processing of a connection request from each client computer to the server computer; and a management system to be connected to the plurality of server computers through a second network, the first network being connected to the second network; wherein the management system calculates a network bandwidth required for processing for booting the server computer, stores a boot request for booting the server computer into a boot request processing queue, determines whether the processing for booting the server computer can be performed or not based on whether a communication data volume required for the processing for booting exceeds an allowable bandwidth of the second network or not, and boots the server computer.

According to the invention, the aforementioned objects are also attained by a communication system including: a plurality of server computers; a plurality of client computers which can be connected to the server computers through a first network, each server computer being booted in accordance with processing of a connection request from each client computer to the server computer; and a management system to be connected to the plurality of server computers through a second network, the plurality of server computers and the management system being connected to a storage system through a third network, the storage system being shared by the plurality of server computers, the first network being connected to the second network; wherein the management system accepts a connection request from each client computer to each server computer, and makes processing for booting the server computer stand by when a communication data volume required for the processing for booting the server computer exceeds an allowable bandwidth of the third network.

Further, according to the invention, the foregoing object is also attained by a communication management method in a communication system including: a plurality of server computers; a plurality of client computers which can be connected to the server computers through a first network; and a management system to be connected to the plurality of server computers through a second network, the first network being connected to the second network; the communication management method including the steps of making the management system accept a connection request from each client computer to each server computer, and making the management system make the connection request from the client computer to the server computer stand by when a communication data volume required for processing for the connection from the client computer to the server computer exceeds an allowable bandwidth of the second network.

BRIEF DESCRIPTION OF THE DRAWINGS

FIG. 2 is a diagram showing an example of the hardware configuration of a management system;

FIG. 5 is a diagram showing an example of the configuration of a connection request processing queue consisting of a plurality of queues;

FIG. 10 is a flow chart for explaining the processing operation in which the management system acts as user's proxy to log in the server computer and then disconnect the server computer so as to make the server computer stand by.

DESCRIPTION OF THE EMBODIMENTS

Embodiments of communication systems and communication management methods according to the invention will be described below in detail with reference to the drawings. The embodiments of the invention which will be described below are not intended to limit the technical scope of the invention.

Figure 1:
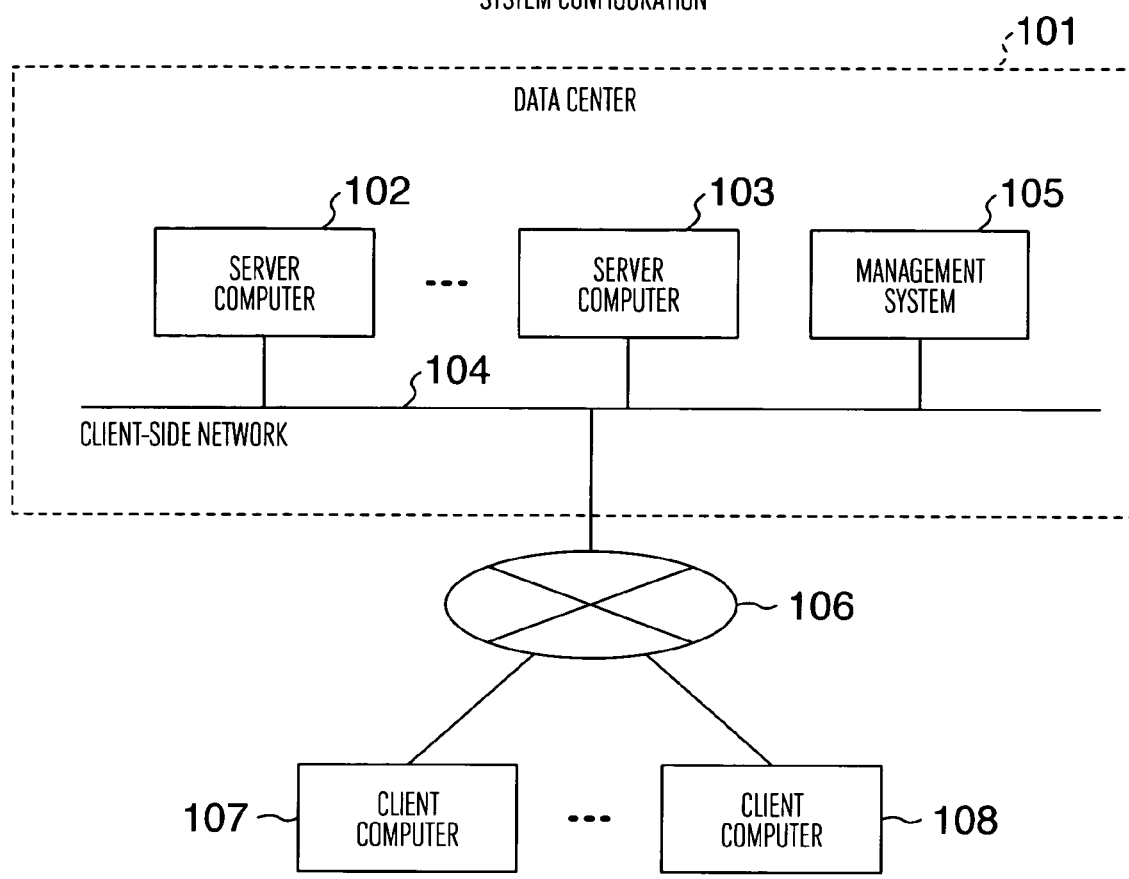
FIG. 1 is a diagram showing the general configuration of a communication system.

FIG. 1 is a block diagram showing the general configuration of a communication system according to an embodiment of the invention. In FIG. 1, the reference numeral 101 represents a data center; 102 and 103, server computers; 104, a client-side network; 105, a management system; 106, a network; and 107 and 108, client computers. Although two server computers and two client computers are shown in FIG. 1, a larger number of server computers and a larger number of client computers may be provided.

The communication system according to the embodiment of the invention is designed as follows. That is, a plurality of server computers 102 and 103 are aggregated and disposed in the data center 101, and the management system 105 is also disposed to implement the invention. The server computers 102 and 103 and the management system 105 are connected to one another through the client-side network 104. Further, the server computers 102 and 103 and the management system 105 can be connected to a plurality of client computers 107 and 108 through the client-side network 104 or through the external network 106 such as the Internet, an intranet or the like.

In the aforementioned configuration, each server computer 102, 103 is a terminal server having a terminal service function. By use of the terminal service function, application software required by each client computer 107, 108 is executed on each server computer 102, 103. The client computer 107, 108 uses a dedicated communication protocol to transmit an input from a user to the server computer 102, 103 and receive screen information from the server computer 102, 103. Thus, the client computer 107, 108 can do desired business or the like.

The server computers 102 and 103 may be connected to the client computers 107 and 108 in a one-to-one relation or a one-to-many relation. Accordingly, one client computer 107 or a plurality of client computers 107 and 108 can be connected to the server computer 102 via the network so as to perform processing simultaneously.

The server computers 102 and 103 do not have to be limited to the terminal servers. They may be usual web servers or the like.

The client-side network 104 is a LAN (Local Area Network) for communication with the client computers 107 and 108 in the data center 101. The client-side network 104 is a general network having a fixed bandwidth of 100 Mbps (bits per second) or 1 Gbps.

The bandwidth means the transfer capacity (transfer rate) of communication data volume of a network, which is expressed in units of the number of bits (bps: bits per second) or the number of bytes (bytes per second) of data transferable per second.

In the aforementioned communication system according to the embodiment of the invention, the server computers 102 and 103 are aggregated and disposed in the data center 101. Accordingly, communications from the client computers 107 and 108 to the server computers 102 and 103 concentrate in the client-side network 104. Each client computer 107, 108 receives a large volume of communication data from each server computer 102, 103 for performing processing of connection to the server computer 102, 103. The communication data include connection information, initialization information, default information, etc. Thus, communication data volume required for the processing of connection from the client computer 107, 108 to the server computer 102, 103 is larger than communication data volume required when the client computer 107, 108 utilizes ordinary service of the server computer 102, 103.

As a result, concentration of processing of connection from the client computers 107 and 108 to the server computers 102 and 103 may lead to the likelihood that the communication data volume will exceed the allowable bandwidth of the client-side network 104. Thus, there arises a fear that congestion occurs in the client-side network 104. To solve this problem, the management system 105 is installed in the client-side network 104 in the embodiment of the invention. The management system 105 controls the processing of connection from the client computers 107 and 108 to the server computers 102 and 103.

FIG. 2 is a block diagram showing an example of the hardware configuration of the management system 105. In FIG. 2, the reference numeral 201 represents a housing; 202, a CPU (Central Processing Unit); 203, a memory; 204, a secondary storage unit; 205, an internal signal line; 206, a communication interface; 207, a display device; and 208, an input device.

The management system 105 is arranged in an ordinary computer system. As shown in FIG. 2, the management system 105 is designed to have the CPU 202, the memory 203, the secondary storage unit 204 such as a hard disk or the like, and the internal signal line 205 such as a bus, in the housing 201. The communication interface 206, the display device 207 such as a display, and the input device 208 such as a keyboard are connected to the surface or the outside of the housing 201. In the management system 105, functions which will be described below are implemented by the CPU 202 by which programs stored in the storage unit 204 are called and executed on the memory 203 under control of an OS (Operating System).

The server computers 102 and 103 and the client computers 107 and 108 can be implemented by the same hardware configuration as the aforementioned management system 105. Each server computer 102, 103 does not have to have the display device 207 such as a display or the input device 208 such as a keyboard. The server computers 102 and 103 may be formed as computer boards each including the CPU 202, the memory 203, the secondary storage unit 204 such as a hard disk and the internal signal line 205 such as a bus and stored in a housing internally provided with a network. The server computer 102, 103 does not have to have its own storage unit 204. Alternatively, if the server computer 102, 103 has its own storage unit 204, the server computer 102, 103 may be designed to be connected through a network to a storage system placed externally and having a plurality of storage regions, without using its own storage unit 204.

Figure 3:
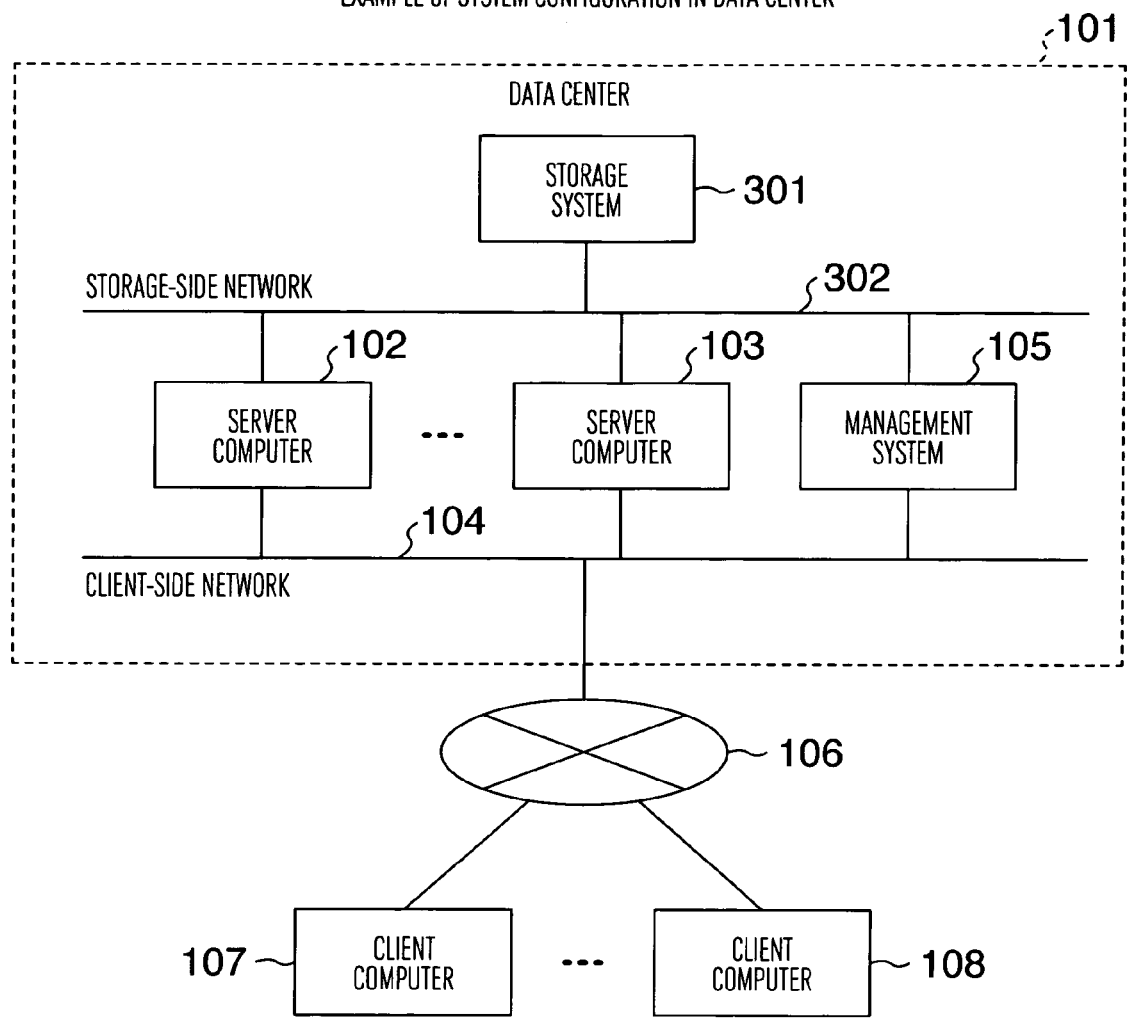
FIG. 3 is a diagram showing the general configuration of another communication system.

FIG. 3 is a block diagram showing the general configuration of a communication system according to another embodiment of the invention. In FIG. 3, the reference numeral 301 represents a storage system; and 302, a storage-side network. The other reference numerals represent the corresponding ones in FIG. 1. According to the embodiment of the communication system shown in FIG. 3, each server computer 102, 103 does not have its own storage unit 204, or the server computer 102, 103 is connected through the network to the storage system 301 placed externally and having a plurality of storage regions, without using the storage unit 204 of the server computer 102, 103 itself.

The server computers 102 and 103 in the communication system shown in FIG. 3 are connected to the storage system 301 through the storage-side network 302. The storage system 301 is internally provided with a plurality of storage regions corresponding to the server computers 102 and 103 respectively. The storage system 301 makes communication with the server computers 102 and 103 using a dedicated protocol such as iSCSI.

The storage-side network 302 is a general network having a fixed bandwidth of 100 Mbps or 1 Gbps in the same manner as the client-side network 104. The storage-side network 302 may be shared as the same network as the client-side network 104.

In the aforementioned communication system according to the embodiment of the invention, the server computers 102 and 103 are aggregated and disposed in the data center 101 in the same manner as in the communication system described with reference to FIG. 1. Accordingly, communications between the storage system 301 and each server computer 102, 103 concentrate in the storage-side network 302. The data volume the server computer 102, 103 acquires from the storage system 301 when the server computer 102, 103 is booted is larger than the communication data volume required when the client computer 107, 108 uses an ordinary application processing service of the server computer 102, 103.

As a result, when the server computer 102, 103 is booted, it is likely that the communication data volume from the storage system 301 to the server computer 102, 103 will exceed the allowable bandwidth of the storage-side network 302. Thus, there arises a fear that congestion occurs in the storage-side network 302. To solve this problem, the management system 105 is installed in the storage-side network 301 in the embodiment of the invention. The management system 105 controls not only the processing of connection described previously, but also the boot processing of the server computers 102 and 103.

Figure 4:
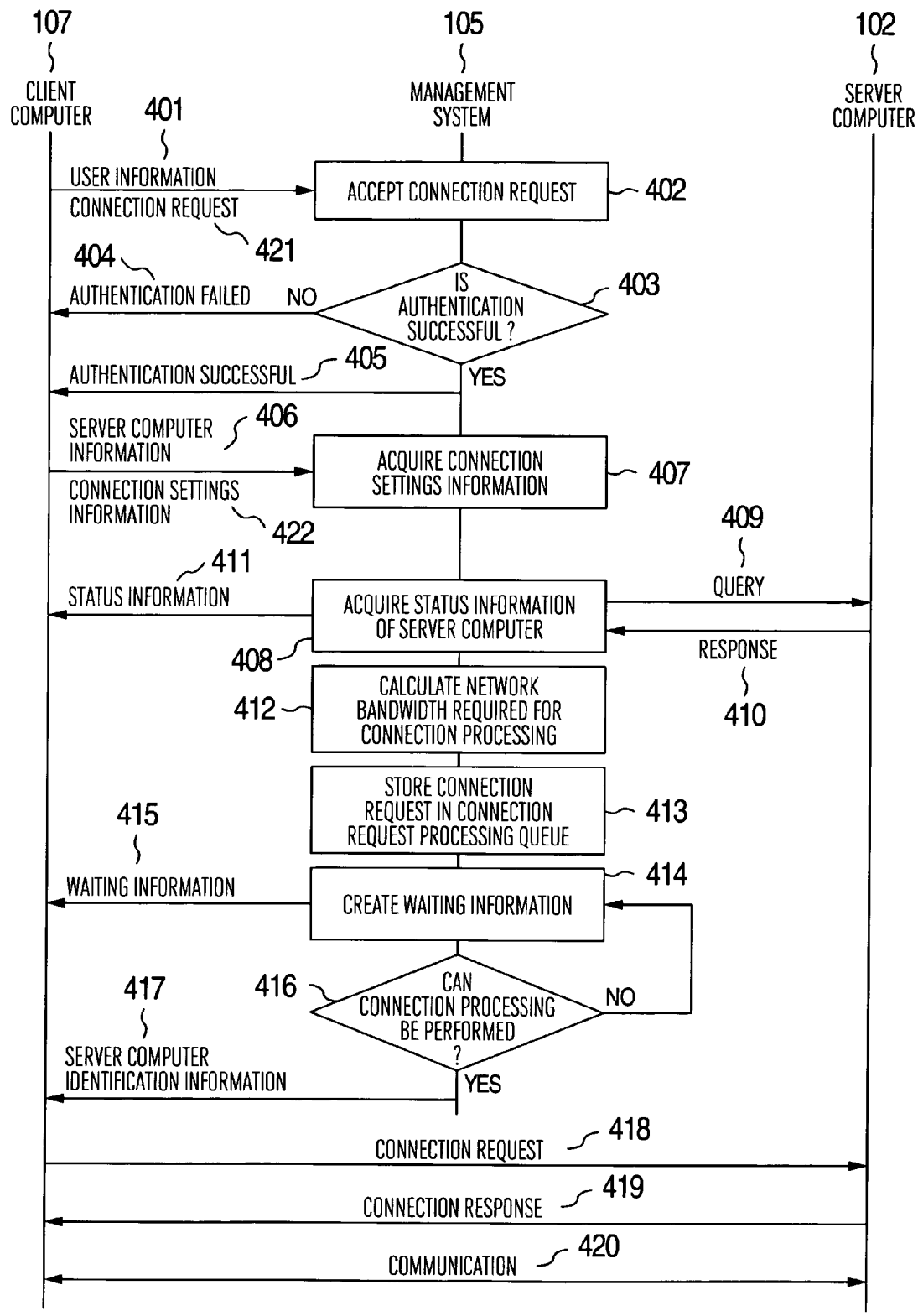
FIG. 4 is a flow chart for explaining the processing operation performed when a client computer intends to connect with a server computer so as to make communication therewith, in which the management system relays a connection request from the client computer to the server computer while controlling the communication data volume of a client-side network.

FIG. 4 is a flow chart for explaining the processing operation performed when the client computer 107 intends to connect with the server computer 102 so as to make communication therewith, in which the management system 105 relays a connection request from the client computer 107 to the server computer 102 while controlling the communication data volume of the client-side network 104. This processing operation will be described next.

(1) The client computer 107 transmits user information 401 and a connection request 421 when the client computer 107 wants to use the server computer 102. The management system 105 receives the user information 401 and the connection request 421 transmitted from the client computer 107. The user information of the client computer 107 is information to authenticate the user of the client computer 107. The user information is made of a combination of a user ID and a password. The password may be a fixed password or a one-time password. Alternatively, a digital certificate or biometric information may be used as the user information (Step 402).

(2) The management system 105 analyzes the user information 401 received in Step 402, and confirms whether the user can be authenticated as a registered user or not. When the authentication is not successful, the management system 105 transmits a message of authentication failure 404 to the client computer 107 and aborts the processing. On the contrary, when the authentication is successful so that it can be confirmed that the user is a registered user, the management system 105 transmits a message of authentication success 405 to the client computer 107 and proceeds with the processing on and after Step 407 (Step 403).

In the aforementioned step, the client computer 107 receiving the message of the authentication failure 404 or the message of the authentication success 405 from the management system 105 displays the message on a display or the like so as to notify the user of the information.

(3) When the authentication is successful in Step 403, the client computer 107 transmits server computer information 406 and connection settings information 422. The management system 105 receives the server computer information 406 and the connection settings information 422 transmitted from the client computer 107. The server computer information 406 is information for specifying the server computer 102 uniquely. The server computer information 406 is information such as a computer name or the like. The connection settings information 422 is information for using service of the server computer 102. When terminal service of the server computer 102 is used, the connection settings information 422 is information about the size and color depth of the screen information received from the server computer 102, connection/disconnection of a local device such as a hard disk or a printer in the client computer 107, the existence of a background image in a transfer screen, and so on. When another service such as service based on a web server function of the server computer 102 is used, the connection settings information 422 is settings information for using the service. The server computer information 406 and the connection settings information 422 may be received together with the user information 401 and the connection request 421 at the time of processing in Step 402 (Step 407).

(4) Next, the management system 105 checks a boot status or a standby status of the server computer 102 as a connection target, and notifies the client computer 107 of the result of the checking. To this end, the management system 105 uses programs of ping, port scan, etc., to issue a query 409 about a boot status of the server computer 102 assigned as the connection target, or a boot status of the connection interface involved in the terminal service of the server computer 102 or the like, and to receive a response 410. Further, as will be described later, the management system 105 may put a query 409 to the server computer 102 as to whether the user has logged in or not, or whether the user having logged in has been disconnected or not, and receive a response 410. After that, the management system 105 transmits the boot status of the server computer 102, the boot status of the service in the server computer 102 and the logging-in status of the user as status information 411 to the client computer 107 based on the response 410 (Step 408).

In the aforementioned step, the client computer 107 receiving the status information 411 from the management system 105 displays the status information 411 on a display or the like so as to notify the user of the information.

Here, the routine of processing proceeds to processing on and after Step 412 on the assumption that the server computer 102 and the service in the server computer 102 have been booted. Processing in the case where the server computer 102 and the service in the server computer 102 have not been booted will be described later with reference to FIG. 6.

(5) The management system 105 calculates a network bandwidth required for processing of connection from the client computer 107 to the server computer 102. When the client computer 107 uses the terminal service of the server computer 102, the required network bandwidth depends on the connection settings information 422 such as the size or the color depth of screen information to be received. The required network bandwidth when the client computer 107 logging in the server computer 102 connects with the server computer 102 differs from that when the client computer 107 once logging in the server computer 102 and then disconnected therefrom connects with the server computer 102 which is in a standby mode due to the disconnection. The network bandwidth may be acquired by reading bandwidth information written in a header portion of a communication packet. Alternatively, the network bandwidth may be included in the connection settings information 422 received by the management system 105 in the processing in Step 407. Alternatively, information about bandwidths may be stored in a database, and a bandwidth corresponding to the server computer information 406, the connection settings information 422, or the like, may be acquired from the database (Step 412).

(6) The management system 105 stores the connection request 421 from the client computer 107 into a connection request processing queue on the memory 203. The connection request processing queue is a queue for processing connection requests, in which a connection request 421 input first will be processed first. As the connection request processing queue, a connection request processing queue consisting of a plurality of queues having different priorities may be provided. The details of the connection request processing queue consisting of a plurality of queues will be described later with reference to FIG. 5 (Step 413).

(7) After that, the management system 105 confirms the waiting time from when the connection request 421 was stored in the connection request processing queue to when it will be processed, and the number of other connection requests that had been stored in the connection request processing queue till the connection request 421 was stored in the queue. The waiting time can be obtained, for example, by Expression (1) when the connection request processing queue consists of a single queue. The waiting time can be also obtained by Expression (1) when the connection request processing queue consists of a plurality of queues.

[Expression 1]

$$\sum_{i=1}^{n} V_{li} T_{li} / V_{l0} \qquad (1)$$

In Expression 1:

n designates the number of connection requests that had been stored in the connection request processing queue till the connection request 421 was stored in the queue;

Vli designates the network bandwidth required for processing of connection for each connection request;

Tli designates the time involved in the processing of connection for each connection request; and V10 designates the effective bandwidth of the client-side network 104.

The management system 105 transmits the waiting time and the number of waiting connection requests as the wait information 415 to the client computer 107. The management system 105 uses a means such as an electronic mail or an SNMP (Simple Network Management Protocol) trap to notify a manager or a device for giving a notification to the manager, of the number of waiting connection requests stored in the connection request processing queue per unit time or the total number thereof periodically in a predetermined cycle or whenever the number or the total number exceeds a predetermined threshold value or breaks a maximum value recorded so far (Step 414).

In the aforementioned step, the client computer 107 receiving the wait information 415 displays it on a display or the like so as to notify the user of the information.

(8) After that, the management system 105 determines whether the processing of connection can be performed or not. When the management system 105 concludes that the processing of connection can be performed, the management system 105 transmits server computer identification information 417 to the client computer 107 so as to allow the client computer 107 to transmit a connection request 418 to the server computer 102. The server computer identification information 417 is information for identifying the server computer 102 uniquely. The server computer identification information 417 is information such as an IP address corresponding to the server computer information 406 or the like. On the contrary, when the management system 105 concludes that the processing of connection cannot be performed, the management system 105 returns to Step 414 and repeats processing again. Whether the processing of connection can be performed or not can be determined based on whether Expression (2) is established or not, or whether Expression (3) is established or not. Each Expression (2), (3) is to confirm whether the client-side network 104 has a free bandwidth required for the processing of connection or not (Step 416).

[Expression 2]

$$V_{l0} - V_{l1} > V_{lc} \quad (2)$$

In Expression (2):

Vl0 designates the effective bandwidth of the client-side network 104;

Vl1 designates the in-use effective bandwidth of the client-side network 104; and Vlc designates the network bandwidth required for the processing of connection for the connection request 421.

[Expression 3]

$$V_{l0} - \sum_{i=1}^{m} V_{li} > V_{lc} \quad (3)$$

In Expression (3):

Vl0 designates the effective bandwidth of the client-side network 104;

m designates the number of connection requests for which processing of connection is in progress;

Vli designates the network bandwidth required for processing of connection for each connection request; and Vlc designates the network bandwidth required for the processing of connection for the connection request 421.

(9) When the client computer 107 receives the server computer identification information 417 from the management system 105, the client computer 107 uses the information to perform the processing of connection to the server computer 102. Thus, the client computer 107 transmits a connection request 418 or the like to the server computer 102, and receives a connection response 419 or the like from the server computer 102. Thus, the processing of connection is completed. The connection response 419 consists of connection information, initialization information, default information, etc. On and after the completion of the processing of connection, the client computer 107 performs communication 420 for using the service of the server computer 102.

FIG. 5 is a diagram showing an example of the configuration of a connection request processing queue consisting of a plurality of queues. Next, description will be made about this.

In the example shown in FIG. 5, a connection request processing queue 503 consists of a plurality of queues having different priorities. A suitable number of queues are prepared in accordance with classification of levels of priorities. When three queues having different priorities are prepared as illustrated in FIG. 5, a connection request 421 from the client computer 107 is input into one of a high-priority queue 504, a medium-priority queue 505 and a low-priority queue 506 by a connection request distribution means 502. The connection request 421 stored in the high-priority queue 504 is processed in preference to any one in the medium-priority queue 505 and the low-priority queue 506. The connection request 421 stored in the medium-priority queue 505 is processed in preference to any one in the low-priority queue 506.

The connection request distribution means 502 distributes the connection request 421 to a queue having a corresponding priority in accordance with the user information 401 from the client computer 107, user's attributes, the position of the client computer 107, the server computer information 406, the connection settings information 422, etc. The user's attributes are information such as an institution, a department, a post, etc. of the user. The priority may be acquired, for example, by use of a method in which the priority is stored in a database in association with the user information 401 in advance, and the database is searched with the user information 401 as a key. The position of the client computer 107 is information about whether the client computer 107 is located in a company or outside the company (home or mobile), or the like. The information about the position of the client computer 107 may be included in the connection settings information 422 or may be determined based on a source IP address of a communication packet from the client computer 107.

Figure 6:
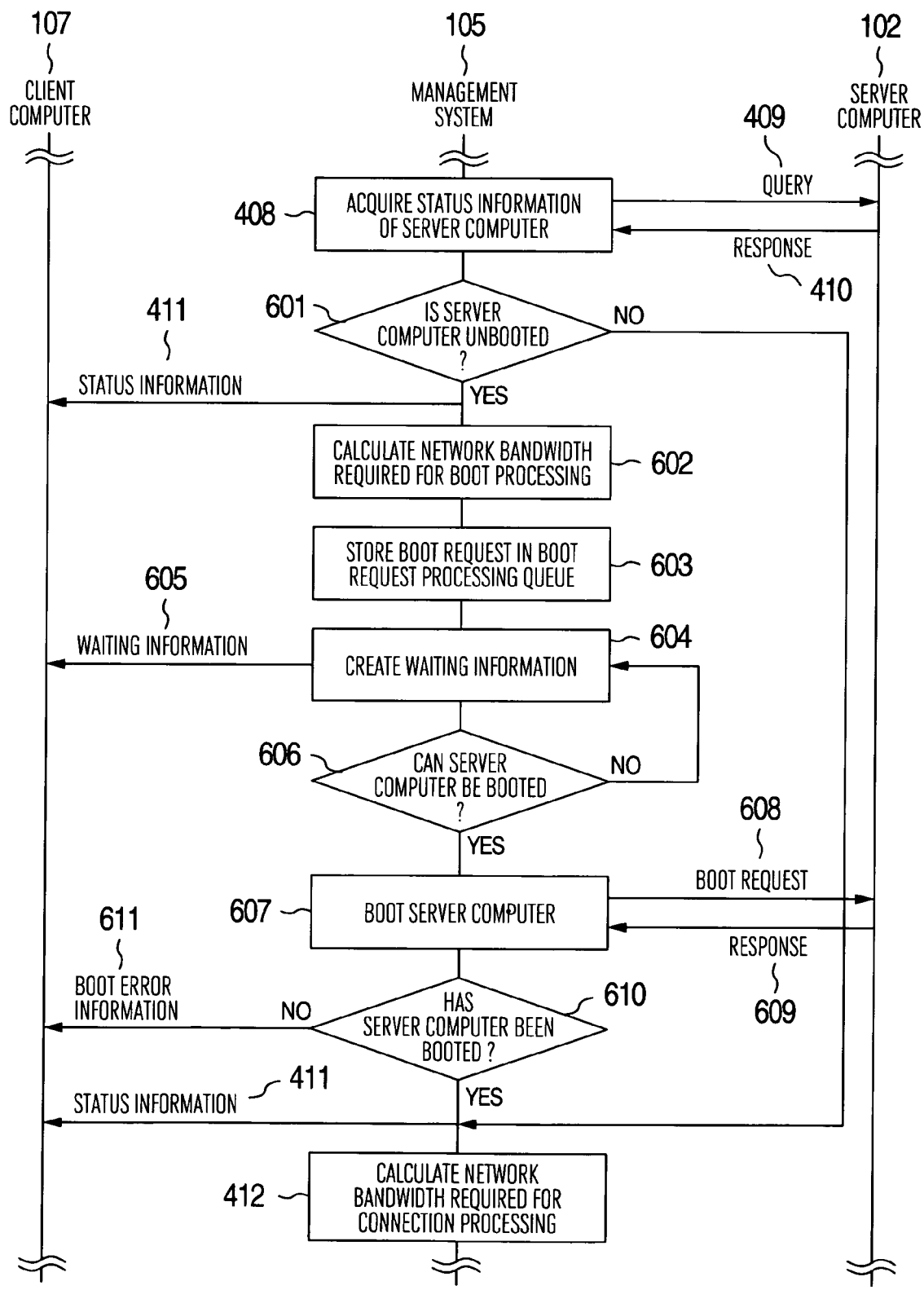
FIG. 6 is a flow chart for explaining processing performed when the client computer intends to connect with the server computer so as to make communication therewith, in which the management system receiving the connection request from the client computer makes control to relay a boot request to boot the server computer while controlling the communication data volume of a storage-side network.

FIG. 6 is a flow chart for explaining processing performed when the client computer 107 intends to connect with the server computer 102 so as to make communication therewith, in which the management system 105 receiving the connection request 421 from the client computer 107 makes control to relay a boot request to boot the server computer 102 while controlling the communication data volume of the storage-side network 302. Next, description will be made about this. The processing shown in FIG. 6 is processing to be inserted between Step 408 and Step 412 in FIG. 4. The processing of Step 408 and the processing of Step 412 in FIG. 6 are the same as the processing of Step 408 and the processing of Step 412 in FIG. 4 respectively.

(1) The management system 105 issues a query 409 as to the status of the server computer 102 as a Connection target. Based on a response 410 from the server computer 102, the management system 105 determines whether the server computer 102 and the service connection interface in the server computer 102 have been unbooted or not. When the management system 105 concludes that the server computer 102 and the service connection interface have been not unbooted but booted, the management system 105 transmits that fact as status information 411 to the client computer 107. Then, the management system 105 proceeds to processing on and after Step 412 described with reference to FIG. 4 (Steps 408 and 601).

(2) When the management system 105 concludes based on the response 410 in Step 601 that the server computer 102 and the service connection interface in the server computer 102 have been unbooted, the management system 105 transmits that fact as status information 411 to the client computer 107. Then, the management system 105 calculates a network bandwidth required for processing for booting the server computer 102. The required network bandwidth depends on the server computer 102 to boot, an OS of the server computer 102, etc. The information of the network bandwidth may be included in the connection settings information 422 received by the management system 105 in the processing in Step 407. Alternatively, information about bandwidths may be stored in a database, and a bandwidth corresponding to the server computer information 406 or the connection settings information 422 may be acquired from the database (Step 602).

(3) The management system 105 stores the boot request to the server computer 102 into a boot request processing queue on the memory 203. The boot request processing queue is a queue for processing boot requests, in which a boot request input first will be processed first. The boot request processing queue has a function similar to that of the connection request processing queue in the processing of Step 413 described with reference to FIG. 4. Therefore, a boot request processing queue consisting of a plurality of queues having different priorities as shown in FIG. 5 may be provided to give priorities to boot requests in accordance with the user information 401 from the client computer 107, user's attributes, the position of the client computer 107, the server computer information 406, the connection settings information 422, etc., and process the boot requests in accordance with the priorities (Step 603).

(4) The management system 105 confirms the waiting time from when the boot request was stored in the boot request processing queue to when it will be processed, and the number of other boot requests that had been stored in the boot request processing queue till the boot request in question was stored in the queue. The waiting time can be obtained, for example, by Expression (4) when the boot request processing queue consists of a single queue. The same thing can be applied to the case where the boot request processing queue consists of a plurality of queues.

[Expression 4]

$$\sum_{i=1}^{p} V_{bi} T_{bi} / V_{b0} \qquad (4)$$

In Expression 4:
  p designates the number of boot requests that had been stored in the queue till the boot request in question was stored in the queue;
  Vbi designates the network bandwidth required for processing of boot for each boot request;
  Tbi designates the time involved in the processing of boot for each boot request; and
  Vb0 designates the effective bandwidth of the storage-side network 302.

The management system 105 transmits the waiting time and the number of waiting boot requests as wait information 605 to the client computer 107. The management system 105 uses a means such as an electronic mail or an SNMP (Simple Network Management Protocol) trap to notify a manager or a device for giving a notification to the manager of the number of waiting boot requests stored in the boot request processing queue per unit time or the total number thereof periodically in a predetermined cycle or whenever the number or the total number exceeds a predetermined threshold value or breaks a maximum value recorded so far (Step 604).

In the aforementioned step, the client computer 107 receiving the wait information 605 displays it on a display or the like so as to notify the user of the information.

(5) After that, the management system 105 determines whether the processing of boot can be performed upon the server computer or not. When the management system 105 concludes that the processing of boot can be performed, the management system 105 proceeds to processing of Step 607, in which the management system 105 boots the server computer 102. On the contrary, when the management system 105 concludes that the processing of boot cannot be performed, the management system 105 returns to Step 604 and repeats processing again. Whether the processing of boot can be performed or not can be determined based on whether Expression (5) is established or not, or whether Expression (6) is established or not. Each Expression (5), (6) is to confirm whether the storage-side network 302 has a free bandwidth required for the processing of boot or not (Step 606).

[Expression 5]

$$V_{b0} - V_{b1} > V_{bc} \qquad (5)$$

In Expression (5):
  Vb0 designates the effective bandwidth of the storage-side network 302;
  Vb1 designates the in-use effective bandwidth of the storage-side network 302; and
  Vbc designates the network bandwidth required for the processing of boot for the boot request in question.

[Expression 6]

$$V_{b0} - \sum_{i=1}^{q} V_{bi} > V_{bc} \qquad (6)$$

In Expression (6):
  Vb0 designates the effective bandwidth of the storage-side network 302;
  q designates the number of boot requests for which processing of boot is in progress;
  Vbi designates the network bandwidth required for processing of boot for each boot request; and
  Vbc designates the network bandwidth required for the processing of boot for the boot request in question.

(6) When the management system 105 concludes in Step 606 that the processing of boot can be performed, the management system 105 performs processing for booting the server computer 102. To this end, the management system 105 transmits a boot request to the server computer 102. When the server computer 102 receives the boot request 608, the server computer 102 boots its own OS, and further boots the service to be provided for the client computer 107. The server computer 102 transmits a response 609 to the management system 105 after booting the service so as to notify the management system 105 of the boot status of the server computer 102 itself, and the boot status of a service connection interface in the server computer 102 itself. Alternatively, the management system 105 may issue a query about the boot status of the server computer 102 and the boot status of the service connection interface in the server computer 102, and receive a response 609 to the query (Step 607).

(7) Based on the response 609 from the server computer 102, the management system 105 determines the boot status of the server computer 102 and the boot status of the service connection interface. When the management system 105 concludes that the server computer 102 and the service connection interface have been booted, the management system 105 transmits status information 411 to the client computer 107, and performs the processing of connection between the client computer 107 and the server computer 102 on and after Step 412 described with reference to FIG. 4. When the management system 105 concludes that booting is failed, the management system 105 transmits boot error information 611 to the client computer 107, and then outputs error information to a log or sends alert information to a manager of the server computer (Step 610).

In the aforementioned processing according to the embodiment of the invention, the management system 105 transmits server computer identification information to the client computer 107 in response to a connection request from the client computer 107 when processing of connection can be performed, while the client computer 107 logs directly into the server computer 102 and connects therewith based on the server computer identification information.

Generally, the communication data volume required when the client computer 107 once logging in the server computer 102 and then disconnected therefrom connects with the server computer 102 is smaller than the communication data volume required for processing when the client computer 107 logs directly into the server computer 102 and connects therewith. Although the client computer 107 may log directly into the server computer 102 and connect therewith, the client computer 107 can connect with the server computer 102 with a smaller volume of communication data in the manner where the management system 105 acts as user's proxy to once log in the server computer 102 and then disconnect the server computer 102. Next, description will be made about processing in such a case.

Figure 10:
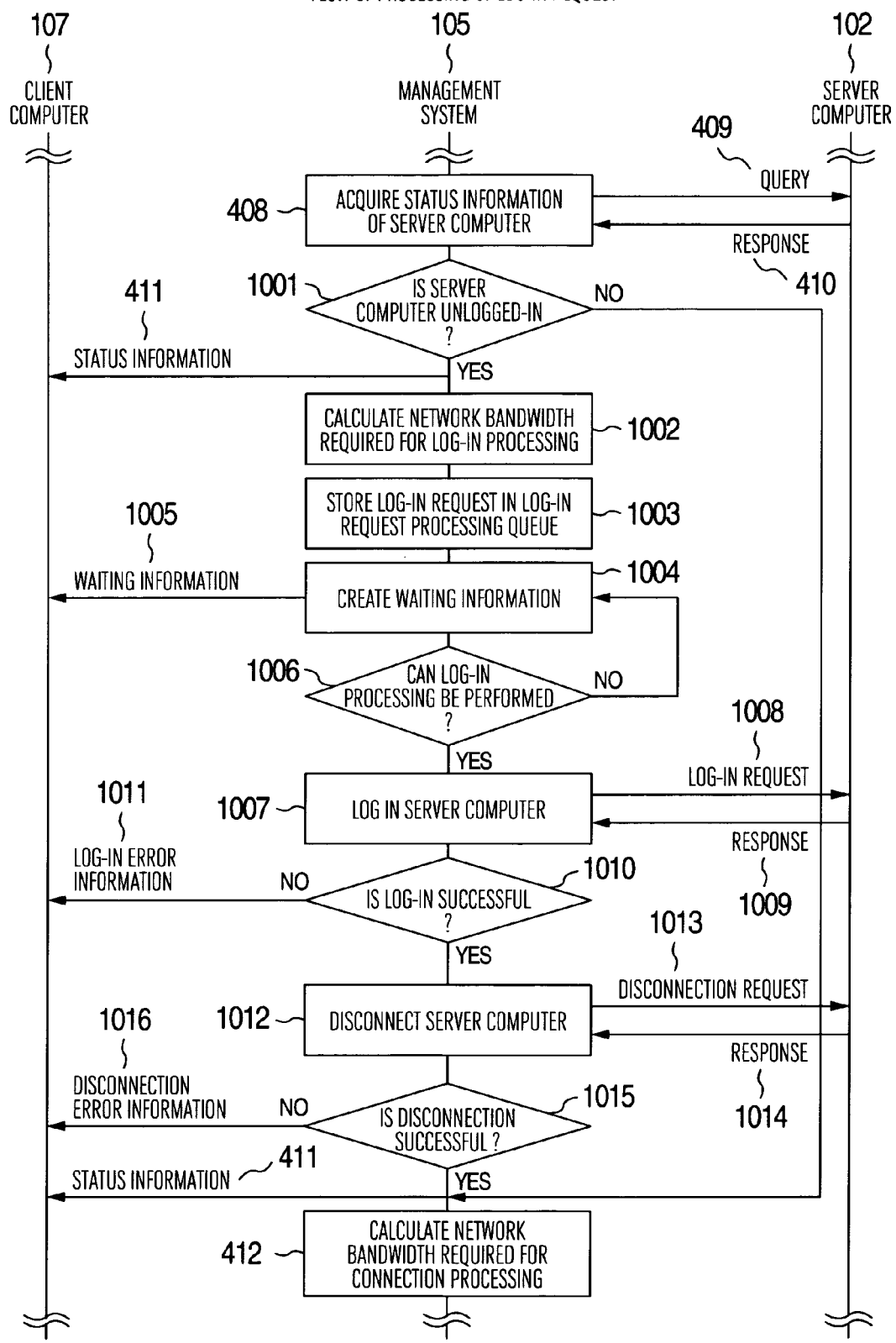

FIG. 10 is a flow chart for explaining the processing operation in which the management system 105 acts as user's proxy to log in the server computer 102 and then disconnect the server computer 102 so as to make the server computer 102 stand by. The processing shown in FIG. 10 is processing to be inserted between Step 408 and Step 412 in the flow chart of FIG. 4. The processing is performed after the processing of boot shown in FIG. 6 when the server computer 102 has been unbooted. The processing of Step 408 and the processing of Step 412 in FIG. 10 are the same as the processing of Step 408 and the processing of Step 412 in FIG. 4 respectively.

(1) The management system 105 issues a query as to the status of the server computer 102 as a connection target. Based on a response 410 from the server computer 102, the management system 105 determines whether the server computer 102 has been unlogged in or not. When the management system 105 concludes that the server computer 102 is in a standby status where the server computer 102 was once logged in and then disconnected, the management system 105 transmits that fact as status information 411 to the client computer 107. Then, the management system 105 proceeds to processing of Step 412 described with reference to FIG. 4. When the management system 105 concludes that the server computer 102 has not been logged in, the management system 105 transmits that fact as status information 411 to the client computer 107. Then, the management system 105 proceeds to processing of Step 1002 (Steps 408 and 1001).

(2) When the management system 105 concludes in Step 1001 that the server computer 102 has been unlogged in, the management system 105 calculates a network bandwidth required for processing for logging into the server computer 102. The required network bandwidth depends on the server computer 102 to be logged in, an OS of the server computer 102, etc. The information of the network bandwidth may be included in the connection settings information 422 received by the management system 105 in Step 407. Alternatively, information about bandwidths may be stored in a database, and a bandwidth corresponding to the server computer information 406 or the connection settings information 422 may be acquired from the database (Step 1002).

(3) The management system 105 stores the log-in request to the server computer 102 into a log-in request processing queue on the memory 203. The log-in request processing queue is a queue for processing log-in requests, in which a log-in request input first will be processed first. The log-in request processing queue has a function similar to that of the connection request processing queue in the processing of Step 413 described with reference to FIG. 4. Therefore, a log-in request processing queue consisting of a plurality of queues having different priorities as shown in FIG. 5 may be provided to give priorities to log-in requests in accordance with the user information 401 from the client computer 107, user's attributes, the position of the client computer 107, the server computer information 406, the connection settings information 422, etc., and process the log-in requests in accordance with the priorities (Step 1003).

(4) The management system 105 confirms the waiting time from when the log-in request was stored in the log-in request processing queue to when it will be processed, and the number of other log-in requests that had been stored in the log-in request processing queue till the log-in request in question was stored in the queue. The waiting time can be obtained in the same method as the method for calculating the waiting time for a connection request in the processing of Step 414 in FIG. 4. The management system 105 transmits the waiting time and the number of waiting log-in requests as wait information 1005 to the client computer 107. The management system 105 uses a means such as an electronic mail or an SNMP (Simple Network Management Protocol) trap to notify a manager or a device for giving a notification to the manager of the number of waiting log-in requests stored in the log-in request processing queue per unit time or the total number thereof periodically in a predetermined cycle or whenever the number or the total number exceeds a predetermined threshold value or breaks a maximum value recorded so far (Step 1004).

In the aforementioned step, the client computer 107 receiving the wait information 1005 displays it on a display or the like so as to notify the user of the information.

(5) The management system 105 determines whether the processing of logging-in can be performed or not. When the management system 105 concludes that the processing can be performed, the management system 105 proceeds to Step 1007, in which the management system 105 logs into the server computer 102. On the contrary, when the management system 105 concludes that the processing of logging-in cannot be performed, the management system 105 returns to Step 1004 and repeats processing again. Whether the processing of logging-in can be performed or not can be determined in the same manner as in the case where the processing of connection is determined in Step 416 described with reference to FIG. 4 (Step 1006).

(6) When the management system 105 concludes in Step 1006 that the processing of logging-in can be performed, the management system 105 performs processing for logging into the server computer 102. Information required for the processing for logging in is included in the user information 401 in Step 402 described with reference to FIG. 4. To perform the processing for logging into the server computer 102, the management system 105 transmits a log-in request 1008 to the server computer 102. When the server computer 102 receives the log-in request 1008, the server computer 102 accepts the log-in processing. The server computer 102 transmits a response 1009 to the management system 105 after the log-in processing so as to notify the management system 105 of the log-in status to the server computer 102. Alternatively, the management system 105 may issue a query about the log-in status to the server computer 102, and receive a response 1009 to the query (Step 1007).

(7) Based on the response 1009 from the server computer 102, the management system 105 determines whether the log-in status to the server computer 102 indicates success in log-in or not. When the management system 105 concludes that the log-in is successful, the management system 105 proceeds to Step 1012. When the management system 105 concludes that the log-in is failed, the management system 105 transmits log-in error information 1011 to the client computer 107, and then outputs error information to a log or sends alert information to a manager of the server computer (Step 1010).

(8) When the management system 105 concludes in Step 1010 that the log-in is successful, the management system 105 performs processing for disconnecting the server computer 102. To this end, the management server 105 transmits a disconnect request 1013 to the server computer 102. When the server computer 102 receives the disconnect request 1013, the server computer 102 executes processing of disconnection. The server computer 102 transmits a response 1014 to the management system 105 after the processing of disconnection, so as to notify the management system 105 of the disconnection status. Alternatively, the management system 105 may issue a query about the disconnection status from the server computer 102, and receive a response 1014 to the query (Step 1012).

(9) Next, based on the response 1014 from the server computer 102, the management system 105 judges the disconnection status from the server computer 102 and determines whether the disconnection is successful or not. When the management system 105 concludes that the disconnection is successful, the management system 105 transmits status information 411 to the client computer 107, and performs the processing of connection between the client computer 107 and the server computer 102 on and after Step 412 described with reference to FIG. 4. On the contrary, when the management system 105 concludes that the disconnection is failed, the management system 105 transmits disconnection error information 1016 to the client computer 107, and then outputs error information to a log or sends alert information to a manager of the server computer (Step 1015).

Generally, the time involved in booting the server computer 102 is much longer than the time involved in connection with the server computer 102. Accordingly, when the server computer 102 is booted in advance before reception of the connection request 421 from the client computer 107, the time of connection from the client computer 107 to the server computer 102 can be shortened. Description will be made below about some examples of processing for booting the server computer 102 in advance before reception of the connection request 421 from the client computer 107. Log-in processing and disconnection processing may be performed in addition to the boot processing which is performed in advance and which will be described below.

Figure 7:
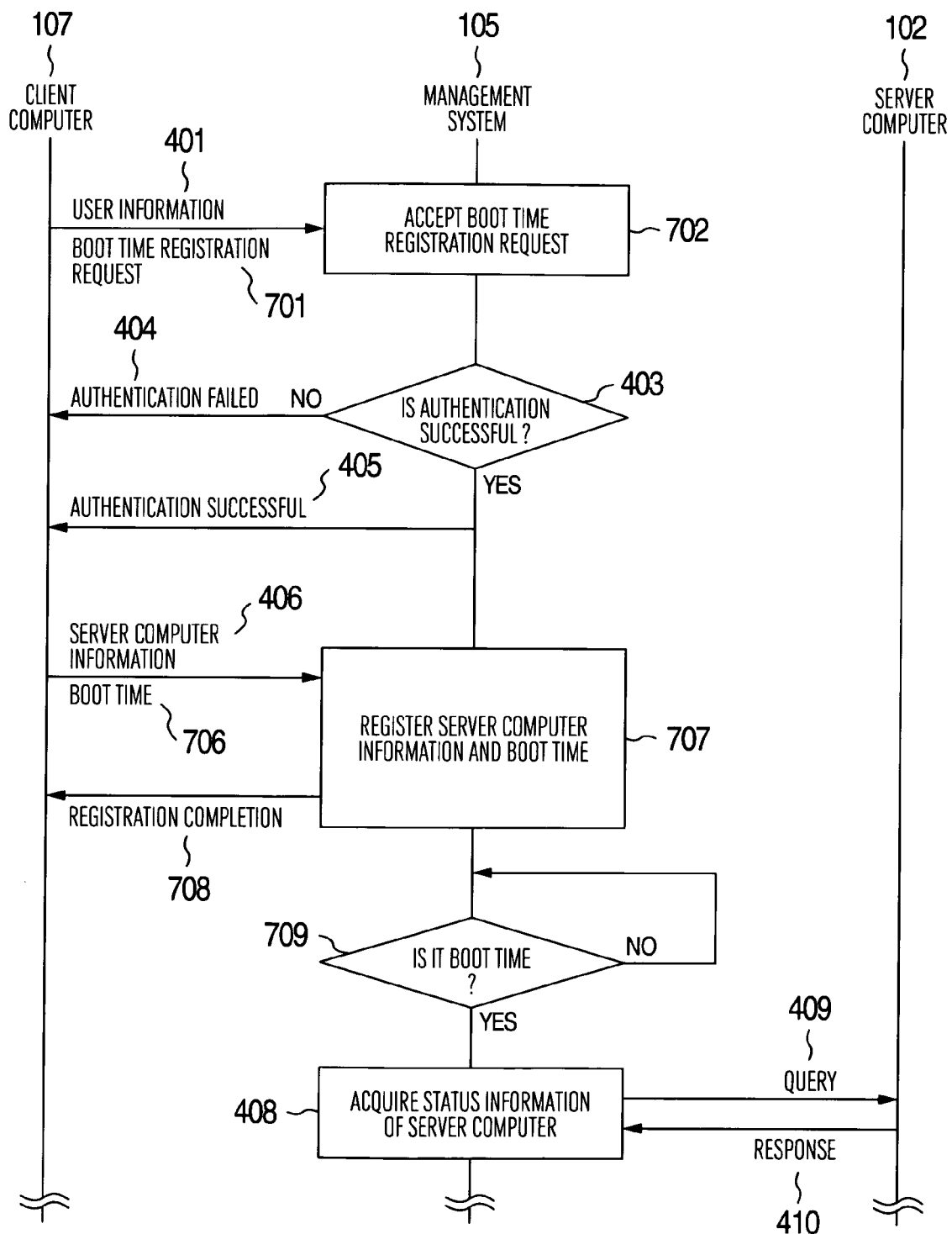
FIG. 7 is a flow chart for explaining the processing operation in which the management system boots the server computer at a time registered by the client computer.

FIG. 7 is a flow chart for explaining the processing operation in which the management system 105 boots the server computer 102 at a time registered by the client computer 107. First, description will be made about this example.

(1) First, the management system 105 receives user information 401 and a boot time registration request 701 transmitted from the client computer 107. After receiving the user information 401, the management system 105 performs authentication processing similar to the processing in Step 403 described with reference to FIG. 4 (Steps 702 and 403).

(2) After success in authentication in Step 403, the management system 105 receives server computer information 406 of the server computer to be connected, and information of boot time 706 from the client computer 107, and registers them. The server computer information 406 and the information of boot time 706 may be received together with the user information 401 and the boot time registration request 701 at the time of the processing in Step 702. When the management system 105 has registered the boot time for the specified server computer 102, the management system 105 transmits a message of registration completion 708 to the client computer 107 (Step 707).

In the aforementioned step, the client computer 107 receiving the message of registration completion 708 displays the message on a display or the like so as to notify the user of the information.

(3) The management system 105 monitors present time and determines whether the present time is the boot time 706 registered in Step 707 or not. When it is not the boot time 706, the management system 105 waits and continues the monitoring processing. When the management system 105 concludes that it is the boot time 706, the management system 105 executes the processing from Step 408 to Step 610 described with reference to FIG. 6, so as to boot the server computer 102. Further, the management system 105 may execute the processing from Step 408 to Step 1015 described with reference to FIG. 10, so as to log into and disconnect the server computer 102. The server computer 102 booted, logged in and disconnected here is kept standby until a connection request 421 from the client computer 107. When the management system 105 receives the connection request 421 from the client computer 107, the management system 105 executes the connection request processing on and after Step 402 described with reference to FIG. 4 (Steps 709 and 408).

Figure 8:
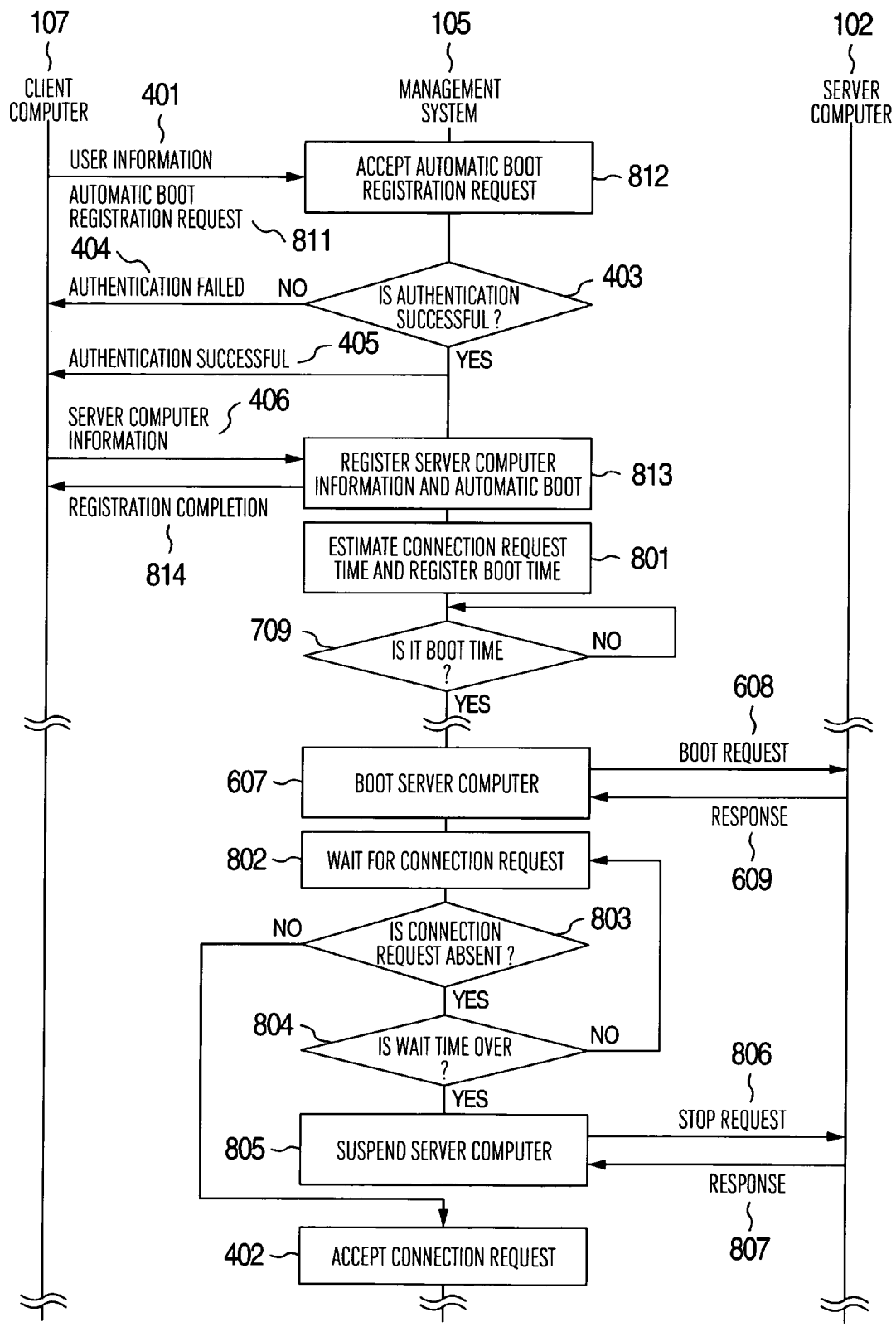
FIG. 8 is a flow chart for explaining the processing operation in which the management system estimates the time when a user will make a connection request to the server computer, and boots the server computer in accordance with the estimated time.

FIG. 8 is a flow chart for explaining the processing operation in which the management system 105 estimates the time when a user will make a connection request to the server computer 102, and boots the server computer 102 in accordance with the estimated time. Next, description will be made about this example.

(1) The management system 105 receives user information 401 and an automatic boot registration request 811 transmitted from the client computer 107. After receiving the user information 401, the management system 105 performs authentication processing similar to the processing in Step 403 described with reference to FIG. 4 (Steps 812 and 403).

(2) After success in authentication in Step 403, the management system 105 receives server computer information 406 of the server computer to be connected, from the client computer 107, and registers the server computer information 406. The server computer information 406 may be received together with the user information 401 and the automatic boot registration request 811 at the time of the processing in Step 812. When the management system 105 has registered the automatic boot for the specified server computer 102, the management system 105 transmits a message of registration completion 814 to the client computer 107 (Step 813).

In the aforementioned step, the client computer 107 receiving the message of registration completion 814 from the management system 105 displays the message on a display or the like so as to notify the user of the information.

(3) The management system 105 estimates the time when a connection request to the server computer 102 will be issued, and registers the estimated time as boot time of the server computer 102. The boot time is, for example, estimated as follows. That is, a history of the user so far is registered. The sum of time required for booting the server computer 102 and error time is subtracted from the earliest connection request time of the registered history information. The time obtained thus is set as boot time. Alternatively, the boot time may be set as follows. That is, a sufficiently early connection request time is obtained stochastically based on the average value of connection request times of the user so far, the variance thereof, and the number of samples. The sum of time required for booting the server computer 102 and error time is subtracted from the obtained sufficiently early connection request time. The time obtained thus is set as boot time (Step 801).

(4) Next, the management system 105 proceeds to Step 709 described with reference to FIG. 7, in which the management system 105 determines whether present time is the boot time estimated and registered in the processing of Step 801 or not. When it is the boot time, the management system 105 executes the processing from Step 408 to Step 610 described with reference to FIG. 6, so as to boot the server computer 102. Further, the management system 105 may execute the processing from Step 408 to Step 1015 described with reference to FIG. 10, so as to log into and disconnect the server computer 102. The server computer 102 booted, logged in and disconnected here is kept standby until a connection request 421 from the client computer 107 (Steps 709 and 607).

(5) The management system 105 waits for a connection request 421 from the client computer 107. The management system 105 determines whether there is a connection request 421 from the client computer 107 or not. When the management system 105 can receive the connection request 421, the management system 105 proceeds to the processing of Step 402 described with reference to FIG. 4, and executes the connection request processing (Steps 802, 803 and 402).

(6) When there is no connection request 421 from the client computer 107 and the management system 105 cannot receive the connection request 421 in the determination of Step 803, the management system 105 determines whether the waiting time of the connection request 421 from the client computer 107 reaches or exceeds a predetermined time or not, that is, whether the waiting time is over or not. When the waiting time is not over, the management system 105 returns to Step 802, in which the management system 105 continues the connection request waiting processing (Step 804).

(7) When the waiting time reaches or exceeds the predetermined time in the determination of Step 804, the management system 105 suspends the booted server computer 102. To this end, the management system 105 transmits a stop request 806 to the server computer 102. When the server computer 102 receives the stop request 806, the server computer 102 suspends the service provided to the client computer 107, and suspends its own OS. The server computer 102 transmits a response 807 to the management system 105 during the suspension of the OS, so as to notify the management system 105 of the suspension status of the service connection interface of the server computer 102 itself, and the suspension status of the server computer 102 itself. Alternatively, the management system 105 may issue a query about the suspension status of the service connection interface of the server computer 102, and the suspension status of the server computer 102, and receive a response 807 to the query (Step 805).

Figure 9:
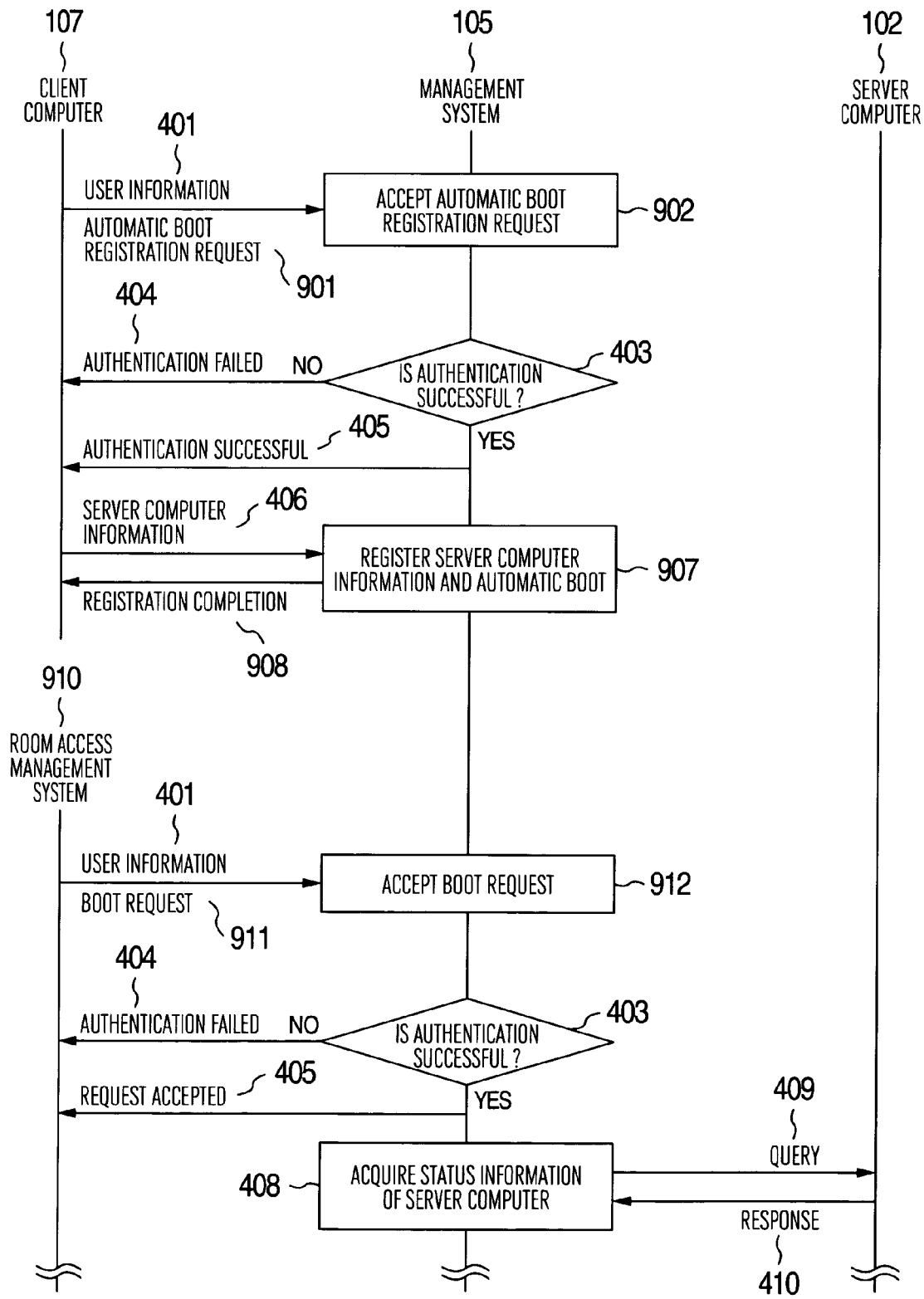
FIG. 9 is a flow chart for explaining the processing operation in which the management system automatically boots the server computer in cooperation with a room access management system.

FIG. 9 is a flow chart for explaining the processing operation in which the management system 105 automatically boots the server computer 102 in cooperation with a room access management system. Next, description will be made about this. The example described here is an example of processing in which the server computer 102 is automatically booted in cooperation with the room access management system for managing the room access of a user of the client computer in an entrance of a room, a building or the like where the client computer is installed.

(1) The management system 105 receives user information 401 and an automatic boot registration request 901 for automatic boot in cooperation with the room access management system, which information and request are transmitted from the client computer 107. The management system 105 receiving the user information 401 performs authentication processing similar to the processing in Step 403 described with reference to FIG. 4 (Steps 902 and 403).

(2) After success in authentication in Step 403, the management system 105 receives server computer information 406 of the server computer to be connected, from the client computer 107, and registers the server computer information 406. The server computer information 406 may be received together with the user information 401 and the automatic boot registration request 901 for automatic boot in cooperation with the room access management system at the time of the processing in Step 902. When the management system 105 has registered the automatic boot for the specified server computer 102, the management system 105 transmits a message of registration completion 908 to the client computer 107 (Step 907).

In the aforementioned step, the client computer 107 receiving the message of registration completion 908 from the management system 105 displays the message on a display or the like so as to notify the user of the information.

(3) After that, triggered by an access of a user to an office or the like, the room access management system 910 transmits the user information 401 and a boot request 911 to the management system 105 based on information of the user confirmed at the time of access to the room. The management system 105 receives the user information 401 and the boot request 911 transmitted by the room access management system 910 (Step 912).

(4) After the management system 105 receives the user information 401, the management system 105 performs authentication processing similar to the processing in Step 403 described with reference to FIG. 4. When the authentication is successful, the management system 105 executes the processing from Step 408 to Step 610 described with reference to FIG. 6, so as to boot the server computer 102. Further, the management system 105 may execute the processing from Step 408 to Step 1015 described with reference to FIG. 10, so as to log into and disconnect the server computer 102. The server computer 102 logged in and disconnected here standby until a connection request 421 from the client computer 107 (Steps 403 and 408).

Subsequently the management system 105 performs processing for waiting for a connection request from the client computer 107 on and after Step 802 described with reference to FIG. 8. When there is a connection request from the client computer 107 as described in FIG. 8, the management system 105 performs the connection processing on and after Step 402 in FIG. 4. When there is no connection request within the waiting time, the management system 105 performs suspension processing for suspending the server computer 102 in Step 805.

In the aforementioned example, description has been made about processing in which the room access management system 910 and the management system 105 work together to boot the server computer 102. However, similar processing can be applied to processing in which the room access management system 910 and the management system 105 work together to suspend the server computer 102 when the user leaves the room. A clock-on/off management system or the like having a similar cooperation function with the management system 105 may be used in place of the room access management system 910.

The processing in the aforementioned embodiments of the invention can be constituted by programs and can be executed by a CPU provided in a computer. Those programs can be provided in a form of a recording medium such as an FD, a CDROM, a DVD, etc. where the programs are stored. The programs can be also provided in a form of digital information through a network.

As described above, the embodiments of the invention can show features and functions as follows.

According to the aforementioned embodiment of the invention, in a communication system constituted by server computers and client computers to be connected to the server computers through networks, a connection request from a client computer to a server computer can be made to stand by when the communication data volume required for processing of connection from the client computer to the server computer exceeds the allowable bandwidth of a client-side network. In addition, a user of the client computer can be notified of waiting information in the processing of the connection request from the client computer to the server computer.

In addition, according to the embodiment of the invention, priority to be given to the processing of the connection request from the client computer can be decided in accordance with the attributes of a user of the client computer, the position of the client computer, the connection settings information to the server computer, etc.

Further, according to the aforementioned embodiment of the invention, in a communication system in which a server computer is booted in accordance with processing of a connection request from a client computer to the server computer, a boot request to the server computer can be made to stand by when the communication data volume required for processing for booting the server computer exceeds the allowable bandwidth of a storage-side network. In addition, a user of the client computer can be notified of waiting information in the processing of the boot request from the client computer to the server computer.

In addition, according to the embodiment of the invention, priority to be given to the processing of the boot request to boot the server computer can be decided in accordance with the attributes of a user of the client computer, the position of the client computer, the connection settings information to the server computer, etc.

Further, according to the embodiment of the invention, the server computer can be booted in advance in accordance with the time registered by the user in advance. In addition, after log-in processing is once performed upon the server computer, the server computer can be made to stand by.

Further, according to the embodiment of the invention, the time the user will issue a connection request can be estimated, and the server computer can be booted in advance. In addition, after log-in processing is once performed upon the server computer, the server computer can be made to stand by.

Further, according to the embodiment of the invention, the server computer can be booted in advance in accordance with room access information of the user. In addition, after log-in processing is once performed upon the server computer, the server computer can be made to stand by.

Further, according to the embodiment of the invention, a manager can be notified of the number of connection requests or the number of boot requests accumulated till a certain time.

Further, according to the embodiment of the invention, the communication data volume required for processing of connection from the client computer to the server computer can be reduced.

In spite of concentration of connection requests from a large number of client computers to a plurality of server computers, connection processing or boot processing can be carried out by these operations while control is made over the communication data volume on the client-side network or the storage-side network which is a network at a point where the server computers are aggregated.

In a communication system for making communication between a plurality of client computers and a plurality of server computers, in spite of concentration of connection requests from a large number of client computers to the server computers, a communication data volume larger than the allowable bandwidth of a network located at a point where the server computers are aggregated can be prevented from being generated. Accordingly, it is possible to obtain a communication system in which congestion can be prevented from occurring. In addition, the waiting time required for a connection request of a user can be reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A communication system comprising:
    a plurality of client computers connected to a first network, and adapted to be connectable to each other through the first network;
    a plurality of server computers each connected to a second network, the first network being connected to the second network;
    a storage system connected to each of the plurality of server computers through a third network; and
    a management system connected to the second network and adapted to be connectable to each of the plurality of server computers through the second network and connected to the storage system through the third network;

wherein the management system accepts a connection request from a client computer requesting connection to a server computer, and makes the connection request from the client computer to the server computer standby when either of a communication data volume required for processing for the server computer from the storage system to the server computer exceeds an allowable bandwidth of the second network or when the communication data volume required for processing for the server computer from the client computer to the server computer exceeds an allowable bandwidth of the third network, and otherwise processes the connection request to the server computer, wherein the management system acquires connection settings information about connection from the client computer to the server computer, calculates a network bandwidth required for processing of the connection from the client computer to the server computer, stores the connection request from the client computer to the server computer into a connection request processing queue, determines whether the processing of the connection from the client computer to the server computer can be performed or not based on whether a communication data volume required for the processing of the connection exceeds the allowable bandwidth of the second network or not or whether a communication data volume required for the processing of the connection exceeds the allowable bandwidth of the third network or not, and notifies the client computer of a result of the determination, and wherein the connection request processing queue consists of a plurality of connection request processing queues having different priorities, and the management system stores the connection request from the client computer to the server computer into one of the connection request processing queues in accordance with at least one of attribute information of a user of the client computer, a position of the client computer, and the connection settings information about the connection from the client computer to the server computer.

2. The communication system according to claim 1, wherein the management system creates waiting information as to processing of a connection request from the client computer to the server computer, and notifies the client computer of the waiting information.

3. The communication system according to claim 1, wherein the management system notifies a manager of a status of the connection request processing queue.

4. A communication system comprising:
a plurality of client computers connected to a first network, and adapted to be connectable to each other through the first network;
a plurality of server computers each connected to a second network, the first network being connected to the second network;
a storage system connected to each of the plurality of server computers through a third network; and
a management system connected to the second network and adapted to be connectable to each of the plurality of server computers through the second network and connected to the storage system through the third network;

wherein the management system at a time of accepting a connection request from a client computer to a server computer, calculates a network bandwidth required for processing for booting the server computer, stores a boot request for booting the server computer into a boot request processing queue, determines whether the processing for booting the server computer can be performed or not based on whether either of: a communication data volume required for the processing for booting exceeds an allowable bandwidth of the second network or not, and the communication data volume required for processing for the server computer from the storage system to the server computer exceeds an allowable bandwidth of the third network, and otherwise processes the connection request to the server computer and boots the server computer, and wherein the boot request processing queue consists of a plurality of boot request processing queues having different priorities, and the management system stores the boot request for booting the server computer into one of the boot request processing queues in accordance with at least one of attribute information of a user of the client computer, a position of the client computer, and the connection settings information about the connection from the client computer to the server computer.

5. The communication system according to claim 4, wherein the management system creates waiting information as to the boot request processing for booting the server computer, and notifies the client computer of the waiting information.

6. The communication system according to claim 4, wherein the management system accepts a boot time registration request as to the server computer from the client computer, registers a boot time of the server computer, and boots the server computer at the registered time.

7. The communication system according to claim 4, wherein the management system estimates a boot time of the server computer, registers the estimated time as a boot time of the server computer, boots the server computer at the registered time, and suspends the server computer when there is no connection request from the client computer at the registered time.

8. The communication system according to claim 4, wherein the management system accepts, from the client computer, an automatic boot registration request to automatically boot the server computer in cooperation with a room access management system, registers the automatic boot of the server computer in cooperation with the room access management system, boots the server computer in cooperation with the room access management system, and suspends the server computer in cooperation with the room access management system.

9. The communication system according to claim 6, wherein the management system performs processing for logging into the server computer and then disconnects the server computer so as to make the server computer stand by.

10. The communication system according to claim 4, wherein management system notifies a manager of a status of the boot request processing queue.

* * * * *